United States Patent [19]

Sidor

[11] 4,095,468
[45] * Jun. 20, 1978

[54] TWO CORE MAGNETIC TEMPERATURE SENSOR

[75] Inventor: Edward Frank Sidor, Lombard, Ill.

[73] Assignee: Illinois Tool Works Inc., Chicago, Ill.

[*] Notice: The portion of the term of this patent subsequent to Apr. 20, 1993, has been disclaimed.

[21] Appl. No.: 763,955

[22] Filed: Jan. 31, 1977

Related U.S. Application Data

[63] Continuation-in-part of Ser. No. 625,784, Oct. 24, 1975, abandoned, which is a continuation of Ser. No. 533,364, Dec. 16, 1974, abandoned.

[51] Int. Cl.² ............................................. G01K 7/38
[52] U.S. Cl. .................................................. 73/362 R
[58] Field of Search ...................... 73/362 R, 362 CP; 317/133; 323/75 H, 75 S; 324/34 TE

[56] References Cited

U.S. PATENT DOCUMENTS

| | | | |
|---|---|---|---|
| 1,945,378 | 1/1934 | Robbins | 73/362 R |
| 3,054,044 | 9/1962 | Shevel, Jr. | 73/362 CP X |
| 3,248,466 | 11/1974 | Dial et al. | 73/362 CP X |
| 3,413,540 | 11/1968 | Vansant | 73/362 CP X |
| 3,950,993 | 4/1976 | Sidor | 73/362 R |

*Primary Examiner*—James J. Gill
*Attorney, Agent, or Firm*—Glenn W. Bowen; Robert W. Beart

[57] ABSTRACT

A temperature sensing device which utilizes a pair of inductively wound magnetic cores is disclosed. The cores are constructed so that the permeability of one core changes with temperature at a rate which is different from the rate that the permeability of the other core changes, with respect to temperature. A plot of inductance vs. temperature, thus varies so that the curves for the two cores intersect at the temperature which is to be sensed. The cores are connected together in a four-arm inductance bridge network and a null detector is coupled to the bridge network to provide an electrical output signal.

9 Claims, 6 Drawing Figures

TWO CORE MAGNETIC TEMPERATURE SENSOR

BACKGROUND OF THE INVENTION

This is a continuation-in-part of application Ser. No. 625,784 filed Oct. 24, 1975, now abandoned, which was a continuation of application Ser. No. 533,364 filed Dec. 16, 1974, now abandoned.

Magnetic cores, such as toroidal-shaped cores, have been previously used for temperature sensing. The prior art methods of temperature sensing utilized transition characteristics of the magnetic core such as the Curie temperature transition and/or first order transitions such as those described in U.S. Pat. No. 3,534,306, issued on Oct. 13, 1970, in the name of Watrous et al. Prior temperature sensing devices of this type relied on the fact that at a certain temperature a drastic change of the magnetic characteristics of the core would occur. Thus, if a wire were wound around the core to form an inductance element, the inductance of the element would change drastically when the predetermined temperature was reached. This required specific core materials that were specially formulated and carefully controlled in order to provide the desired rapid transition at the exact temperature that was desired. A different specially manufactured magnetic core would then have to be substituted in the sensor in order to sense another temperature.

The sensing device of the present invention, by contrast, does not depend upon any rapid change of inductance state of the magnetic core. In the present sensing device, the inductance of the cores varies in a gradual manner until the inductance of both cores is approximately equal at a predetermined temperature which is then sensed by the sensing circuit. The advantage of this approach over the prior art devices is that by changing the inductance of the core by changing the number of windings on the core, the crossover point where the two inductances are equal may be changed so that the temperature sensor may be used over wide range temperatures.

The present invention is achieved by coupling the two inductively wound cores having different inductance vs. temperature characteristics into a four-arm A.C. inductance bridge circuit having two terminals that are connected to a conventional null detector. When the inductance vs. temperature characteristics of the two cores cross at a predetermined temperature, the inductances are equal; and the null detector indicates that the desired temperature has been reached. Although two magnetic cores have been connected in series to achieve temperature compensation, as is shown in U.S. Pat. No. 3,824,502; issued on July 16, 1974, to Bardash et al, the utilization of two series connected magnetic cores that have different temperature characteristics for sensing temperatures over a relatively large range of temperatures without a transition change of the magnetic state of the core has not previously been accomplished.

The applicant's temperature sensor devices, consisting of the two independent inductively wound cores may be employed by placing the cores both in the same temperature environment. They also may be used with one of the cores, placed in a reference temperature environment and the other core placed in an environment to be sensed. In this mode of operation they are capable of functioning somewhat like a thermocouple. This capability is not found in the device of the Robbins U.S. Pat. No. 1,945,378 in which a unitary transformer structure has one arm made of a material in which the permeability varies with temperature. The device of the Robbins patent was massive and thermally slow.

Also, the device of the Robbins patent depends upon a division of flux between the relatively constant permeability vs. temperature arm and the variable permeability vs. temperature arm. Functionally, this is of significant importance since, when the Robbins device is used to indicate a temperature, both arms of the device will be substantially at the same temperature due to heat conduction of one arm to the other. This means that the device of the Robbins patent is essentially useful only when both of the arms are contained in the same temperature environment. On the other hand, a thermocouple will not operate if both of the elements are placed in the same temperature environment. Thus, unlike either the thermocouple or the device of the Robbins patent, the present invention may be utilized in both types of applications without modification of the sensor other than to provide sufficient lead length, because of the provision of two separate and independent magnetic cores having controlled temperature dependent permeability.

When the sensing device of the present invention is used, constant monitoring of the temperature difference between two separate temperature environments may be achieved, and with this type of sensing the fast thermal response and the small size of the magnetic cores of the present invention are often of real significance. These sensors alternately may be used in a single temperature environment by placing both of the cores in the environment and, thus, versatility is another important advantage of the present invention.

DESCRIPTION OF THE DRAWINGS

The present invention is illustrated by reference to the following drawings in which.

TECHNICAL DESCRIPTION OF THE INVENTION

The present invention utilizes a pair of magnetic cores which are preferably toroidal-shaped cores and which are wound with at least one electrical wire to form a pair of inductance elements. Elongated, hollow tube-shaped cores, like those shown in FIG. 4, could alternately be employed in the circuit of FIG. 1 if desired. The inductance vs. temperature characteristics of the two cores are purposely made to be different, preferably due to the employment of different materials in each of the cores. The cores 10, 12 are preferably constructed of linear material as contrasted to a square-loop material used in the device of the Bardosh et al patent. One of the cores of the present invention may be constructed of a material that is commercially sold by the Ferroxcube Corporation under the name of Ferroxcube 3E2A and the other material may be made of Ferroxcube 3D3 material. The inductance of one of the two cores will be less than the other below a predetermined sensing temperature and will be greater than the inductance of the other core above the predetermined sensing temperature. At the predetermined desired sensing temperature, the inductance of both cores will be equal. In the described version of the sensor, the core utilizes a single sense wire each and, hence, they act as inductances while in another described embodiment the cores utilize a drive winding in addition to the sense winding and, hence, they function as transformers in this version of the invention to provide the desired inductance vs. temperature characteristics.

Figure 1:
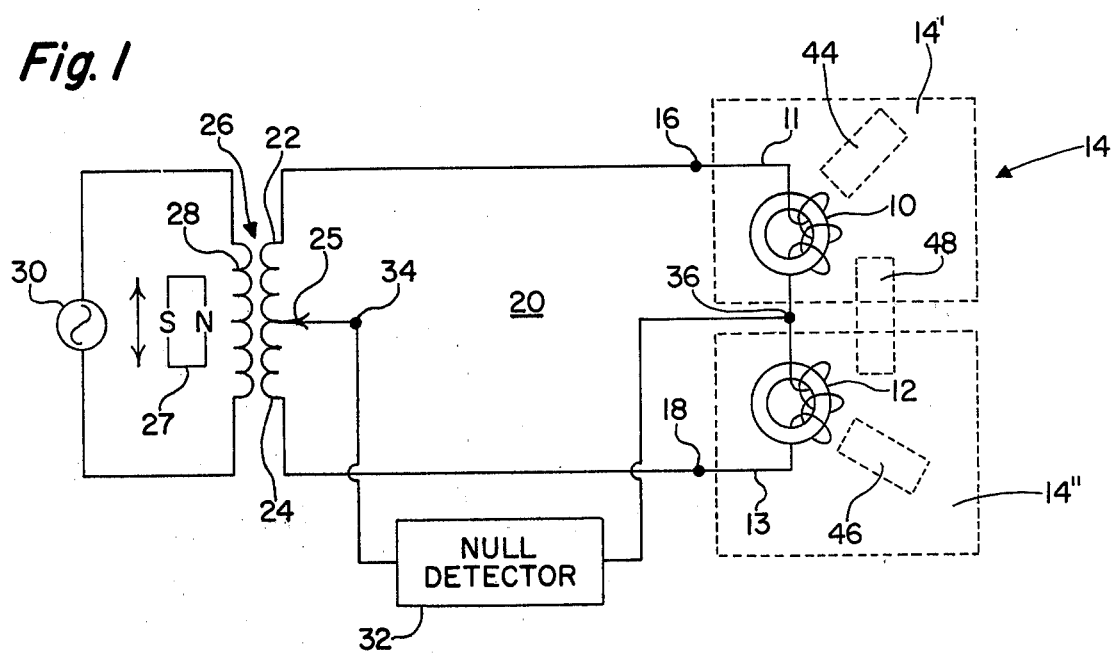
FIG. 1 is a schematic illustration of a described embodiment of the present invention.

The inductively wound cores 10, 12 shown in the schematic of FIG. 1 may be contained in a separate unit 14 which may be positioned at a remote location in order to sense the ambient temperature at that location. Alternatively, the core 10 may be placed in one temperature environment 14' while the core 12 may be located in a separate temperature environment 14" so that temperatures in this environment 14' and 14" may be compared. The cores 10, 12 are wound with the wires 11, 13 which are connected to the terminals 16, 18, respectively, of a four-arm inductive bridge circuit 20. The other two inductive bridge circuit impedances are formed by the secondary windings 22, 24 of a transformer 26. The primary winding 28 of the transformer 26 is coupled to an alternating source of voltage 30. A conventional null detector circuit 32 is connected across the terminals 34, 36 of the bridge circuit 20 to sense when the inductance of the two cores 10, 12 are equal so it can provide an electrical output signal which indicates that the desired temperature has been sensed. The null detector 32 may be replaced by any conventional sensing device or circuit for sensing the output of an A.C. bridge circuit; the design of such devices and circuits being well-known in the art.

Figure 2:
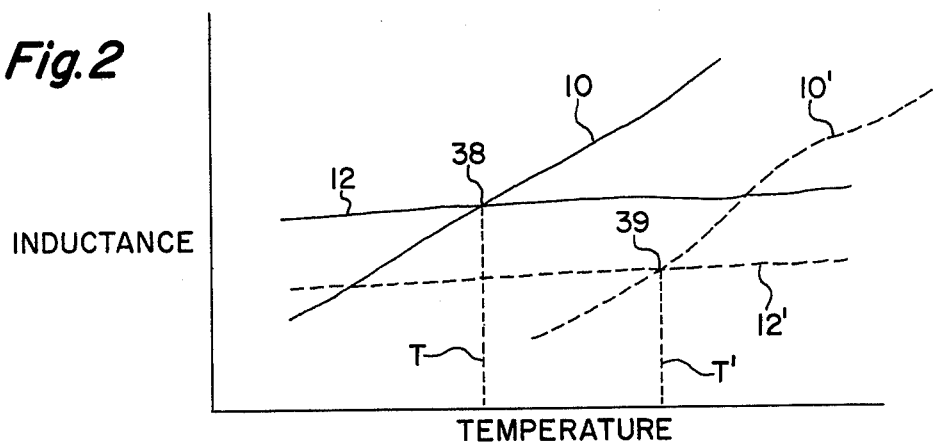
FIG. 2 is a graph showing the inductance vs. temperature characteristics of the two magnetic cores employed in the circuit of FIG. 1.

An inductance vs. temperature plot for the cores 10, 12 is in FIG. 2 where the solid line curves 10, 12 correspond respectively to the cores 10, 12 of FIG. 1. It can be seen from this graph the two curves cross at the intersection point 38 which represents the temperature T which is to be sensed. The inductance of the cores 10, 12 can be easily changed by changing the number of windings on the cores; and thus, a new temperature T' may be sensed by changing the windings in a controlled manner due to a shifting of the inductance vs. temperature characteristics 10', 12' to different locations so that they cross at the point 39, as shown by the dotted line curves. The crossover temperature of the sensor might be controlled by adjusting the position of one or more magnets, such as the magnets 44, 46 adjacent the cores 10, 12, without changing the number of windings on the cores. A single magnet 48 affecting both cores could be used to obtain temperature crossover adjustment, if desired. A temperature sensor having a relatively large sensing range, is, therefore, provided by the present invention. The reference temperature that is to be sensed may be controlled by adjustment of the control wiper 25 which is connected to the secondary windings 22, 24 of the transformer 26, or alternately by utilization of saturable transformer windings and at least one movable magnetic control element, such as the magnet 27, that is magnetically coupled to the windings.

While the inductance of the curve 10' preferably increases with increasing temperature and the inductance of the curve 12' preferably either decreases or remains relatively constant, this is not a necessary requirement. Unlike the temperature compensating elements of the previously mentioned Bardash et al patent, it is not necessary for the permeability of one core to increase while the other core decreases, it being sufficient that the inductance vs. temperature characteristics of the two cores merely vary differentially so that they intersect at the desired temperature to be sensed.

Figure 3:
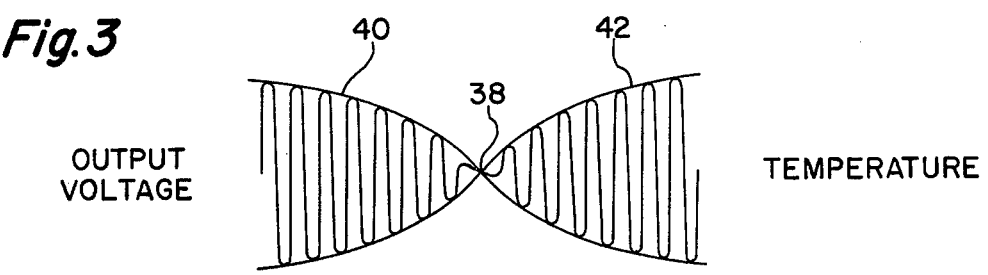
FIG. 3 is a diagrammatic illustration showing an output voltage signal vs. temperature characteristics for the schematic of FIG. 1.

FIG. 3 illustrates the output signal that is sensed by the null detector 34. It is seen that when the temperature is below the sensing temperature T, the output signal 40 is of a first phase, but that the magnitude of the output signal will decrease as the crossover point 38 is approached. At the crossover point 38 no reading is obtained by the null detector indicating that the desired temperature T has been reached. As the temperature increases beyond the sensed temperature T, the output signal 42 is of a phase which is opposite to the phase of the output signal 40 and increases in magnitude as the temperature increases beyond the intersection point 38. Although a null detector is the presently preferred output detector because of its simplicity, it is desirous that other types of detectors, including magnitude and phase responsive indicators, may be employed in the present invention.

Figure 4:
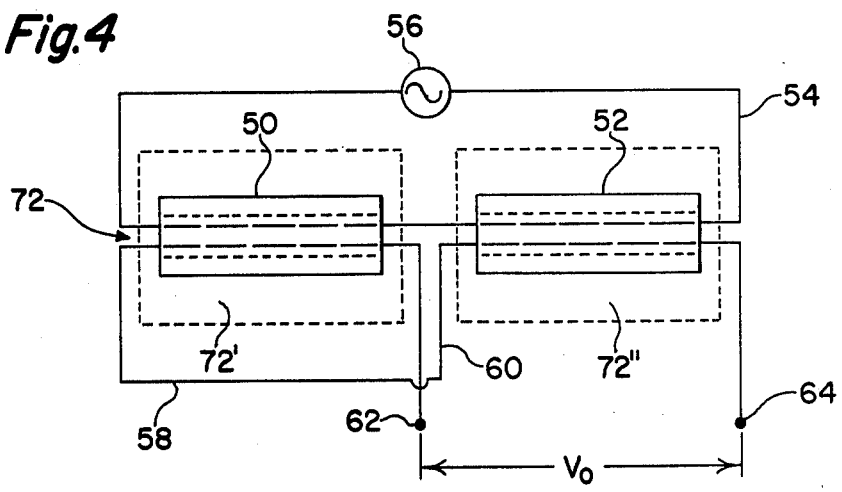
FIG. 4 is a schematic diagram of another version of the present invention which utilizes elongated, hollow tube magnetic cores and primary and secondary transformer windings which are coupled to the cores.

Another version of the present invention is illustrated in FIG. 4 in which two elongated, hollow tube magnetic cores 50, 52 are employed. The cores 50, 52 of FIG. 4 are both coupled to a common drive winding 54, which passes through both cores and is connected to an A.C. voltage source 56. Each of the cores 50, 52 are also coupled to separate sense lines 58, 60, respectively. A single line is shown for the drive or primary winding and the sense or secondary windings of the transformer wound sensing devices of FIG. 4, although it is apparent that these windings could comprise multiturn windings. Moreover, it is not necessary that the number of windings coupled to each core be equal, although they are illustrated as being equal in the embodiment of FIG. 4.

Figure 5:
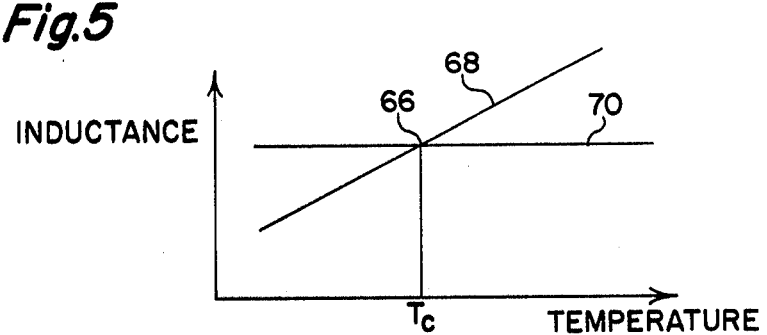
FIG. 5 is a graph showing the inductance vs. temperature characteristics of the two magnetic cores of FIG. 4.
Figure 6:
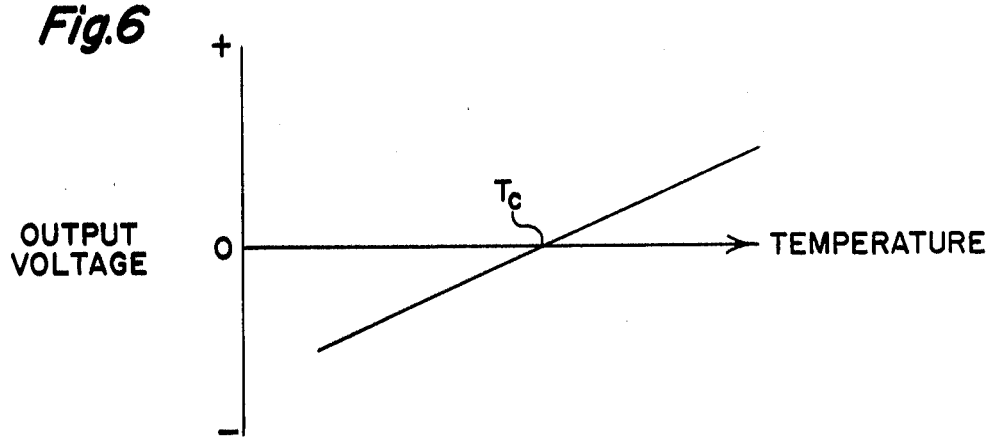
FIG. 6 is a graph showing the output voltage vs. temperature crossover curve for the magnetic cores of FIG. 4.

The sense or secondary windings 58 and 60 may be connected in an opposing fashion, as shown in FIG. 4 so that the output voltage, Vo, across the terminals 62, 64 will be zero when the inductances of the two cores 50, 52 and their respective windings are equal. The temperature at which this occurs, Tc, is shown graphically in FIG. 6. FIG. 5 shows the corresponding inductance vs. temperature characteristic where the point 66 indicates that the inductance associated with the core 50, which is represented by the line 68, is equal to the inductance associated with the core 52, which is represented by the line 70.

Like the cores 10, 12 of FIG. 1, the cores 50, 52 may be placed together in the same temperature environment at a remote location 72, or they could be located in different temperature environments 72', 72" so these two temperature environments could be compared to determine when they are equal. Adjustment magnets affecting both cores, or only one of the cores 50, 52, could also be employed, if desired, in a manner similar to that described in connection with the embodiment of FIG. 1.

The sensors of the present invention are seen to be small, relatively inexpensive and thermally very fast. They are also quite versatile since they may be used to either compare temperature equality in two separate locations or to measure the attainment of a particular temperature at a single remote location without any change of the construction of the sensor being required except to insure that sufficient lead length is provided for the desired application.

What is claimed is:

1. A temperature sensor comprising first and second separate inductively wound elongated, hollow, tube-shaped magnetic cores, each having an independent, self-contained magnetic flux path provided by a closed loop configuration of magnetically permeable material so that no substantial amount of magnetic flux is externally coupled from either of said cores, said cores having different inherent magnetic permeability vs. temperature characteristics which are controlled so that the inductance vs. temperature characteristics of the two cores intersect at the temperature which is to be sensed, within a predetermined temperature range, and so that neither of said cores undergoes either a first or a second order transition over said temperature range, an alternating current source of voltage coupled to said sensor and sensing means coupled to said sensor which indicates that at least one of said magnetic cores is affected by a temperature of a predetermined magnitude when the output signals derived from said magnetic cores are approximately equal.

2. A temperature sensor as claimed in claim 1 wherein one of said cores is in the temperature environment where it is affected by said predetermined temperature which is to be sensed and the other of said cores in a reference temperature environment.

3. A temperature sensor as claimed in claim 1 wherein said magnetic cores from a voltage dividing network with said alternating current source of voltage coupled across said network and sensing means coupled to said network.

4. A temperature sensor as claimed in claim 3 wherein said magnetic cores are inductively wound so as to form a three-terminal device with said alternating current source of voltage coupled across two terminals of said device and said sensing means coupled to a third terminal of said device.

5. A temperature sensor as claimed in claim 1 wherein a permanent magnet means is positioned adjacent one of said cores and is adjustable with respect to the position of said core.

6. A temperature sensor as claimed in claim 1 wherein separate permanent magnet means are positioned adjacent each of said cores and said permanent magnet means are independently adjustable with respect to the position of their associated cores.

7. A temperature sensor comprising first and second separate inductively wound magnetic cores, each having an independent, self-contained magnetic flux path provided by a closed loop configuration of magnetically permeable material so that no substantial amount of magnetic flux is externally coupled from either of said cores, said cores having different inherent magnetic permeability vs. temperature characteristics which are controlled so that the inductance vs. temperature characteristics of the two cores intersect at the temperature which is to be sensed, within a predetermined temperature range, and so that neither of said cores undergoes either a first or a second order transition over said temperature range, an alternating current source of voltage coupled to said sensor and sensing means coupled to said sensor which indicates that at least one of said magnetic cores is affected by a temperature of a predetermined magnitude when the output signals derived from said magnetic cores are approximately equal, and a transformer having a primary winding and two secondary windings, said primary winding being coupled to said voltage source and said secondary windings comprising first and second impedance arms of a four-arm bridge circuit while said inductively wound magnetic cores comprise third and fourth impedance arms of said four-arm bridge circuit.

8. A temperature sensor as claimed in claim 5 and further comprising an adjustable means associated with said transformer for adjusting the temperature at which said sensing means will respond.

9. A temperature sensor as claimed in claim 7, wherein said sensing means is a null detector which is coupled across two terminals of said bridge circuit which senses when the impedances of said inductively wound magnetic cores are approximately equal.

* * * * *